United States Patent [19]

Kuboki et al.

[11] Patent Number: 5,058,114
[45] Date of Patent: Oct. 15, 1991

[54] PROGRAM CONTROL APPARATUS INCORPORATING A TRACE FUNCTION

[75] Inventors: Shigeo Kuboki, Nakaminato; Norihiko Sugimoto, Katsuta; Syunji Inada; Masahiro Ueno, both of Hitachi; Takeshi Harakawa, Hadano; Kazuhisa Inada, Hitachi; Toshihiko Tominaga, Katsuta; Yasushi Nakamura, Hitachiohta, all of Japan

[73] Assignees: Hitachi, Ltd.; Hitachi Engineering Co., Ltd., both of Tokyo, Japan

[21] Appl. No.: 324,214

[22] Filed: Mar. 14, 1989

[30] Foreign Application Priority Data

Mar. 15, 1988 [JP] Japan .................. 63-60970

[51] Int. Cl.⁵ .......................................... G06F 11/00
[52] U.S. Cl. .................................. 371/19; 371/16.5; 371/29.1
[58] Field of Search ............... 371/19, 16.5, 29.1; 364/200 MS File

[56] References Cited

U.S. PATENT DOCUMENTS

| | | | |
|---|---|---|---|
| 3,937,938 | 2/1976 | Mathews | 371/29.1 |
| 4,308,581 | 12/1981 | Raghunathan | 371/29.1 |
| 4,423,508 | 12/1983 | Shiozaki et al. | 371/16.5 |
| 4,445,192 | 4/1984 | Haag et al. | 364/900 |
| 4,598,364 | 7/1986 | Gum et al. | 364/200 |
| 4,636,940 | 1/1987 | Goodwin, Jr. | 371/19 |
| 4,783,762 | 11/1988 | Inoue et al. | 371/19 |
| 4,802,165 | 1/1989 | Ream | 371/19 |
| 4,879,646 | 11/1990 | Iwasaki et al. | 371/16.5 |
| 4,896,321 | 1/1990 | Kawahara | 371/16.1 |
| 4,918,693 | 4/1990 | Ardini, Jr. et al. | 371/16.5 |

OTHER PUBLICATIONS

"Microcomputer Handbook", published by Ohm, Dec. 25, 1985 p. 780 (1985).

Primary Examiner—Jerry Smith
Assistant Examiner—Phung My Chung
Attorney, Agent, or Firm—Fay, Sharpe, Beall, Fagan, Minnich & McKee

[57] ABSTRACT

In a program control apparatus with a program ROM which forms sequence control signals for executing various control actions according to specified conditions, a memory circuit is provided which is activated during a particular operation mode to successively store information corresponding to the external conditions and also information on times taken by the operation sequence of the program control apparatus.

30 Claims, 5 Drawing Sheets

PROGRAM CONTROL APPARATUS INCORPORATING A TRACE FUNCTION

BACKGROUND OF THE INVENTION

This invention relates to a program control apparatus and more particularly to a technique that can effectively be applied to a program controller such as a controller (processor) in a local-area network (LAN).

Generally, the interface between a transmission medium of a LAN and terminal equipment consists of a transceiver that performs conversion between electrical levels and logic levels and a controller that performs data buffering, assembly and disassembly of transmission formats such as packets, and network access control. Such LANs are described in the "Microcomputer Handbook," published by Ohm on Dec. 25, 1985, page 780.

The interface for the LAN may effectively be formed of a processor using a microprogram system. This is because when the interface is to support the data link layer in the open systems interconnection (OSI) reference model, complex protocol must be supported.

To develop processors of a microprogram system or debug LSI (large scale integration) circuits requires a trace function for tracing the flow of a program. Emulators and logic analyzers have trace memories to store the addresses of commands executed up to a breakpoint. Checking the contents of the trace memory allows one to know how the program ran before it reached the breakpoint. However, such emulators and logic analyzers are not only expensive but also require an LSI system to be designed to fit them.

SUMMARY OF THE INVENTION

The object of this invention is to provide a program control apparatus which has a debug function with a relatively simple configuration.

These and other objects and novel features of this invention will become apparent from the following detailed description and attached drawings.

A representative configuration of the invention disclosed in this specification may be outlined as follows. Provided is a program control apparatus with a program ROM that forms sequence control signals for executing various control operations according to specified set conditions. A memory circuit is also provided which is activated during a specified operation mode to successively store information corresponding to the above external conditions and also information concerning the time spent for the operation sequence.

Checking the contents of the above memory circuit allows one to know how the sequence control operation has been executed under a specified condition, making it possible to easily debug a microprogram being developed or perform a system debugging in the real equipment.

DESCRIPTION OF THE PREFERRED EMBODIMENT

Figure 1:
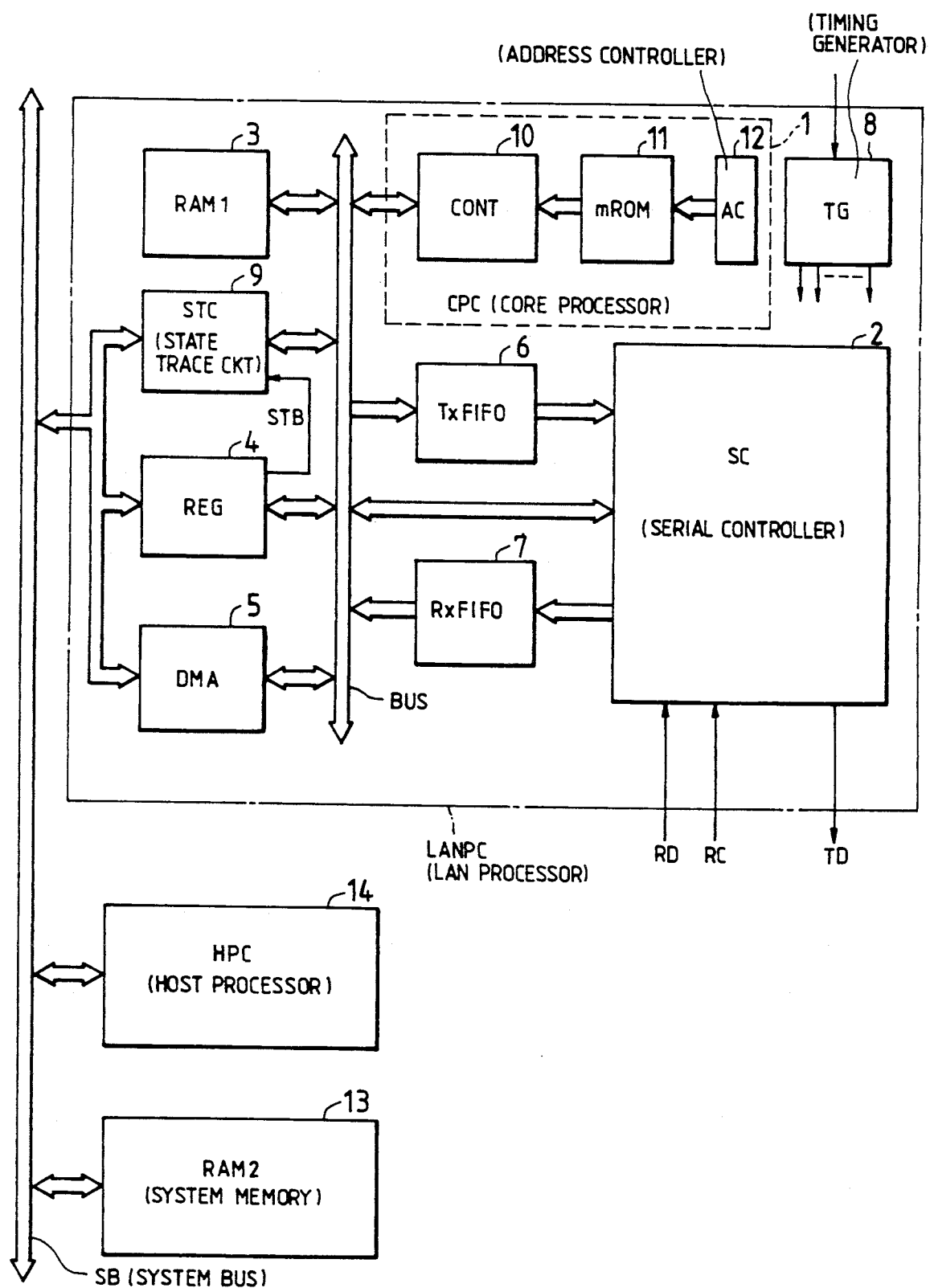
FIG. 1 is a block diagram showing one example configuration of a LAN processor to which this invention is applied and terminal devices connected to the processor.

FIG. 1 shows an example block diagram of a LAN processor to which this invention is applied and of terminal devices connected to the processor.

The LAN processor (referred to simply as a processor hereafter or LANPC) consists of a circuit block enclosed by a one-dot line and is formed on, though not limited to, one semiconductor substrate such as monocrystal silicon by a known technique of manufacturing semiconductor ICs.

This processor consists of a core processor CPC 1, a serial controller SC 2, a memory RAM1 3 that work as an internal register, a group of registers (control and status registers) REG 4, a bus controller DMA 5, a memory for transmission TxFIFO 6, a memory for reception RxFIFO 7, a timing generator TG8, and a state trace circuit STC 9. The core processor CPC 1 consists of a controller CONT 10, a microprogram ROM mROM 11 and an address controller AC 12.

The core processor CPC 1 controls external circuits according to the microprogram control scheme and also transmits various function blocks and data through internal bus BUS. The serial controller SC 2 receives data RD and clocks RC from communication circuits through external terminals and feeds data to be transmitted TD on the communication circuits through external terminals.

When there is a request to send, in the case of a medium access control (MAC) frame, it is transferred from the core processor CPC 1 through the internal bus BUS to the transmission memory TxFIFO 6 in a DMA (direct memory access) mode. In the case of a logical link control (LLC) frame, it is transferred from a system memory RAM2 13 to the transmission memory TxFIFO 6 in the DMA mode under the control of the bus controller DMA 5. Then, the data is fed to the serial controller SC where it undergoes various processings such as a parallel/serial conversion, a frame check sequence (FCS) generation and a delimiter generation to be formed into transmission data TD.

When frames of data are received, they are loaded temporarily in the receiving memory RxFIFO 7. If they are MAC frames, they are transferred to the core processor CPC 1 through the internal bus BUS. In the case of LLC frames, they are transferred to the system memory RAM2 13 in the DMA mode through the internal bus BUS, bus controller DMA 5 and system bus SB. These transmission and reception operations are controlled by a host processor HPC 14.

Such processors LANPC incorporate a state trace circuit STC 9 to facilitate debugging and developing of a microprogram ROM mROM11. The state trace circuit STC 9 is enabled to perform its diagnostic function by a specified bit (STB) assigned to a control register REG 4 (or RAM1 3 that works as a general purpose register).

Figure 2:
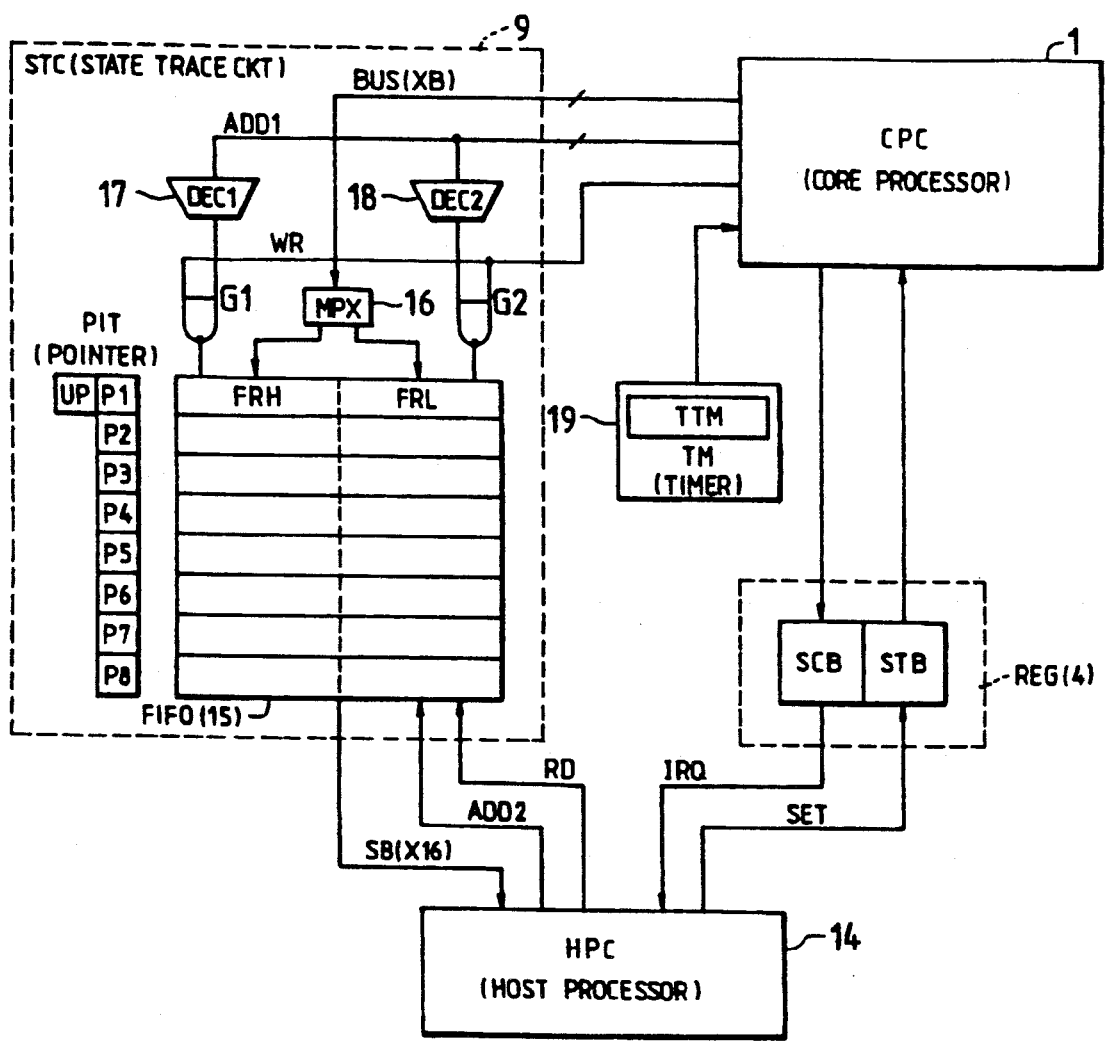
FIG. 2 is a block diagram showing an example configuration of a self-diagnostic circuit (state trace circuit) and its associated major circuits.

FIG. 2 shows a block diagram of the above state trace circuit STC 9 and the associated major circuits. The state trace circuit STC 9 uses an FIFO memory as shown in the Figure.

In this example, the internal data bus BUS of the processor LANPC is 8-bits wide and the system bus SB connected to the host processor HPC 14 is 16-bits wide. In this case, the FIFO memory 15 has a 16-bit configuration which is divided in two, i.e., eight higher order bits FRH and eight lower order bits FRL. 8-bit data on the internal data bus BUS are fed to a multiplexer MPX 16 and written into the FIFO memory 15, 8 bits at a time. The FIFO memory uses eight 16-bit registers, which are connected so that their corresponding bits form a shift register. That is, data written in the top or first stage register is transferred parallelly toward the lower registers.

Decoder circuits DEC1 17 and DEC2 18, upon receiving an address signal ADD1 from the core processor CPC 1, generates a selection signal for the divided 8-bit registers FRH and FRL and controls gate circuits G1 and G2 by the selection signal. The gate circuits G1 and G2, according to the selection signals, transfer a write/read control signal WR to the corresponding registers FRH and FRL. In this way, the core processor CPC 1 can write into and read from the FIFO memory 15 eight bits at a time.

The second and lower stage registers forming the FIFO memory may each have a one-bit pointer P2 to P8. The first stage register has pointers UP and P1. The pointer referred to here means a flag indicating that the corresponding register in the FIFO memory contains data. A pointer "0" indicates that there is no valid data contained in the corresponding register, while "1" indicates that valid data is stored in the register.

The core processor CPC 1 reads the pointers UP and P1 for the first stage register and, when both bits are "0" writes trace information (described later) into the FRH and FRL of the top register, 8 bits at a time. When either of the pointer UP or P1 is "1" it does not write that information but holds the write operation in a standby condition. In FIG. 2, signal lines for reading the pointers UP and P1 to P8 are omitted to prevent the diagram from becoming complicated.

When the above trace information is written into the first stage register, the data is shifted down to a register stage immediately before the one whose pointer is "1." When the contents of the FIFO memory 15 are all zero, the data is shifted down to the lowermost register When the pointer for a register is "1" and the pointer for the next register is "0," the above shifting operation is accomplished by a logic operation which consists of shifting the data to the next register and at the same time clearing the pointer for the preceding register.

A timer circuit TM 19 may be formed of a 16-bit binary counter circuit and a register which stores a count value that can be read out by the core processor CPC 1. The above counter circuit counts the duration of the previous state (to be described later). The core processor CPC 1 transforms the 16-bit measured time information read from the register into data of a numerical format with a 4-bit real part and a 4-bit exponential part, which is trace information to be stored in the FIFO memory 15.

In this embodiment the trace information for debugging uses a current state number, a transient event number and the duration of a previous state, instead of microinstructions. With this information used as trace information, debugging can be done by the simple state trace circuit STC 9. The current state number, the transient event number and the previous state duration will be detailed later.

A state change bit SCB contained in the control register REG 4 is set by the core processor CPC 1 when a state transition occurs, sending an interrupt signal IRQ to the host processor HPC 14, prompting it to access and read the FIFO memory 15. The host processor HPC14 enables the state trace function mode by setting the state trace bit STB in the control register REG 4.

Figure 3:
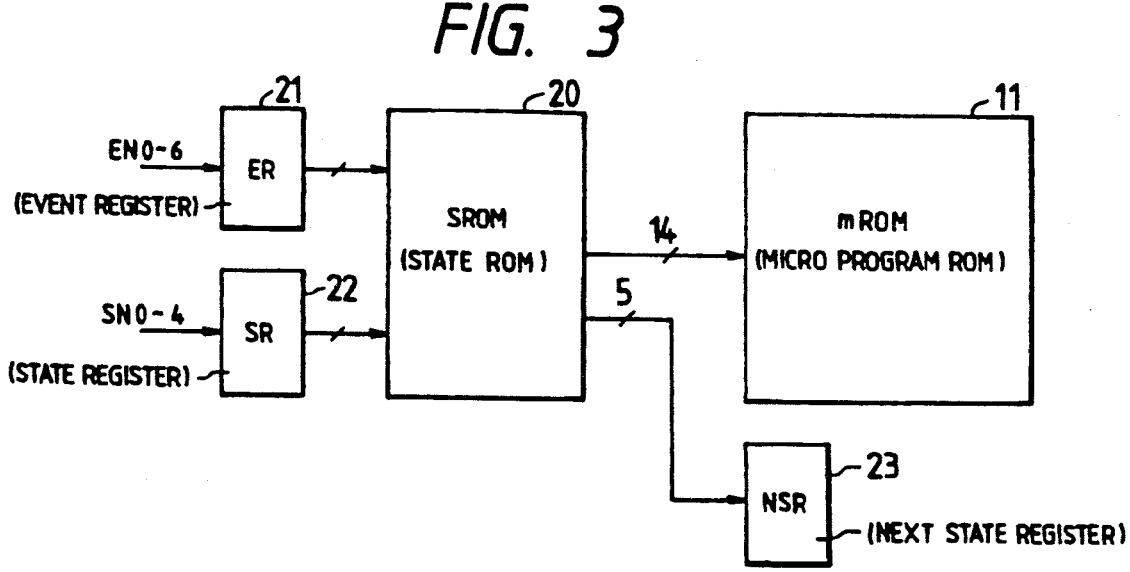
FIG. 3 is a block diagram showing one example configuration of a microprogram ROM and an address generator.

FIG. 3 shows an example block diagram for the address controller AC 12 and the microprogram ROM mROM 11 of the core processor CPC 1.

The communication protocol of the processor LANPC consists of a state table read only memory (state ROM) SROM 20 and a microprogram ROM mROM 11. The state ROM SROM 20 is supplied with numbers as addresses from an event register ER 21 and a state register SR 22. The state ROM 20 uncodes the supplied numbers to form a read address for the microprogram ROM 11 and also form a next state number. The next state numbers are set in the next state register NSR 23.

The command is executed in the following sequence. Event numbers EN0 to EN6 are set in the event register ER 21 and present state numbers SN0 to SN4 are set in the state register SR 22. Then a state subroutine call instruction is executed. The state ROM 20 sets a 5-bit next state number in the next state register NSR 23 and at the same time sends an address to the microprogram ROM 11 to start a processing that was being performed before a transition was made to the next state, thereby executing a next-state task. The address signal for the microprogram ROM 11 consists of 14 bits, and the valid address space in the core processor CPC 1 is about 16k words from 800H to FFCH (H: hexadecimal).

In this embodiment, the state change information input to the state ROM 20, instead of the address (microintruction) of the microprogram ROM 11, is traced to determine during which transition or during which state processing task an error has occurred, thus making debugging easy. Compaction of the above trace information permits reduction of the size of the state trace circuit STC 9 as with the FIFO memory 15.

Figure 4:
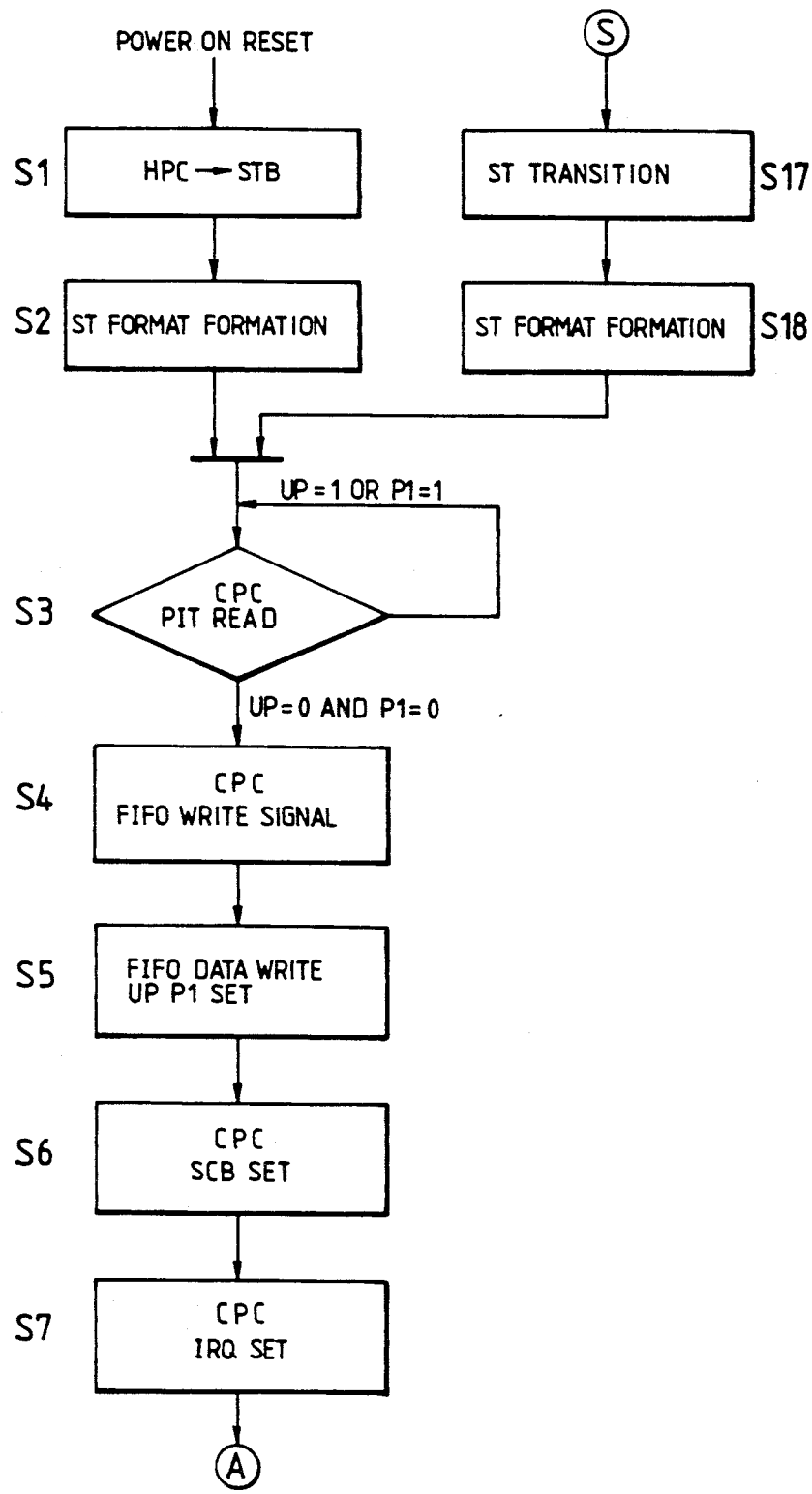
FIGS. 4 and 5 are flowcharts explaining one example of operation of the invention.
Figure 5:
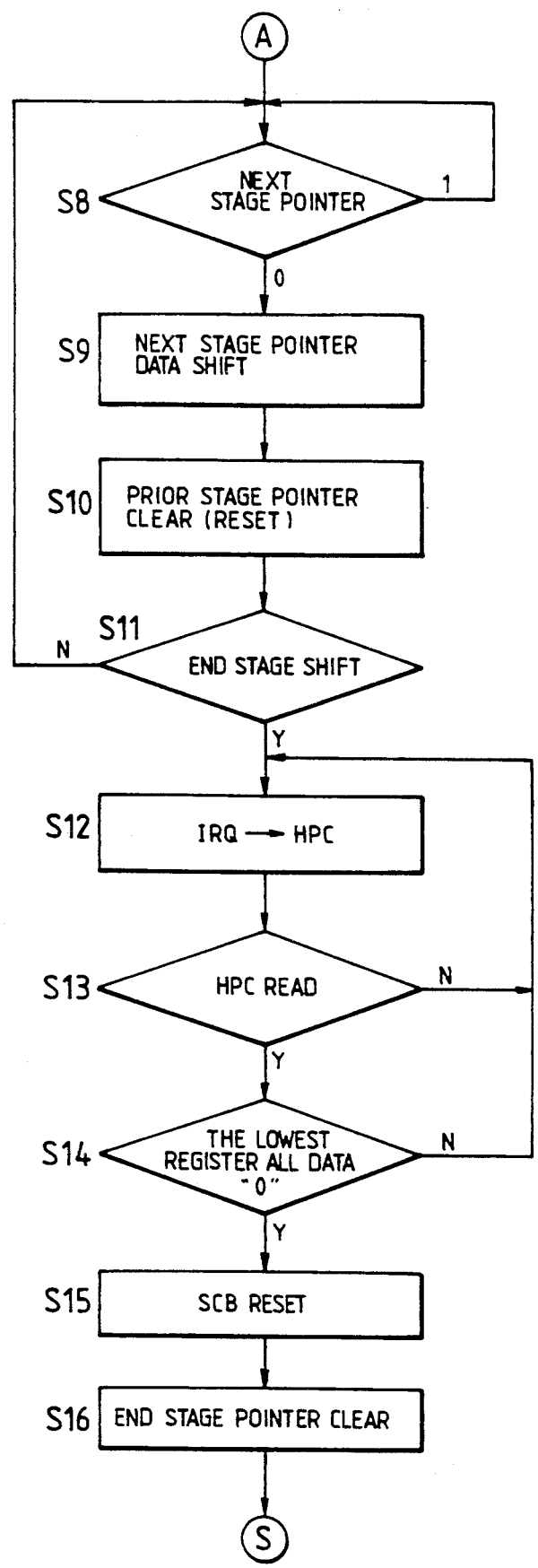

FIGS. 4 and 5 are flowcharts explaining one example of operation of the state trace circuit STC 9.

Immediately after power-on and resetting, an initial routine S1 is executed to cause the host processor HPC 14 to set the state trace bit STB to "1" (write), enabling the state trace function of the state trace circuit STC 9.

At step S2, the host processor HPC 14 sets a present state number in the present state register SR22 and clears the event register ER21, the next state register NSR23 and the FIFO register 15 to "0" (ST format generation).

In the normal mode, as in step S17 and S18, the core processor CPC 1 generates a transition trace format including the present state number, transition event number, and previous state duration each time a state transition occurs At step S3, the core processor CPC 1 reads pointers UP and P1 for the first stage register in the FIFO memory 15 in the state trace circuit STC9. When both pointers are "0" the process moves to step S4 where the core processor CPC 1 generates a write signal for the FIFO memory 15. At step S5, data is written into the FIFO memory 15 and the pointers UP and P1 are set to "1". At step S6, the core processor CPC 1 sets the state change bit SCB to "1". At step S7, the core processor CPC 1 sets an interrupt signal IRQ to interrupt the host processor HPC 14.

The succeeding process is shown in FIG. 5.

At step S8 of FIG. 5, when the pointer for the next stage register is "1", the transition information written in the first stage register is left alone. When the pointer is "0", the transition information is shifted to the next stage register at step S9 and, at step S10, the pointer for the previous stage register or the first stage register is reset to "0".

When at step S11 data shifting to the lowermost register is completed, the interrupt signal IRQ that was generated is applied at step S12 to the host processor HPC 14 to interrupt it.

At step S13, upon being interrupted, the host processor HPC 14 reads the lowermost register of FIFO15. After the read operation is finished, the data in the lowermost register is automatically cleared to all zeros.

When at step S14 the lowermost register is read again and the pointer P8 is found to be "0," the read operation is terminated. When the pointer 8 is "1," the read operation is continued.

Next, at step S15 the state change bit SCB is also reset. After this, the process moves to step S17 of FIG. 4. When a state transition occurs the format for the state transition is generated at step S18. Table 1 shows one example of the format.

TABLE 1

| $2^{15}$ | $2^{12} \, 2^{11}$ | $2^8 \, 2^7$ | $2^4 \, 2^3$ | $2^0$ |
|---|---|---|---|---|
| Present state | State transition event | Elapsed time | | |
| | | Real number part | Exponential part | |

⟵ FRH ⟶  ⟵ FLR ⟶

Figure 6:
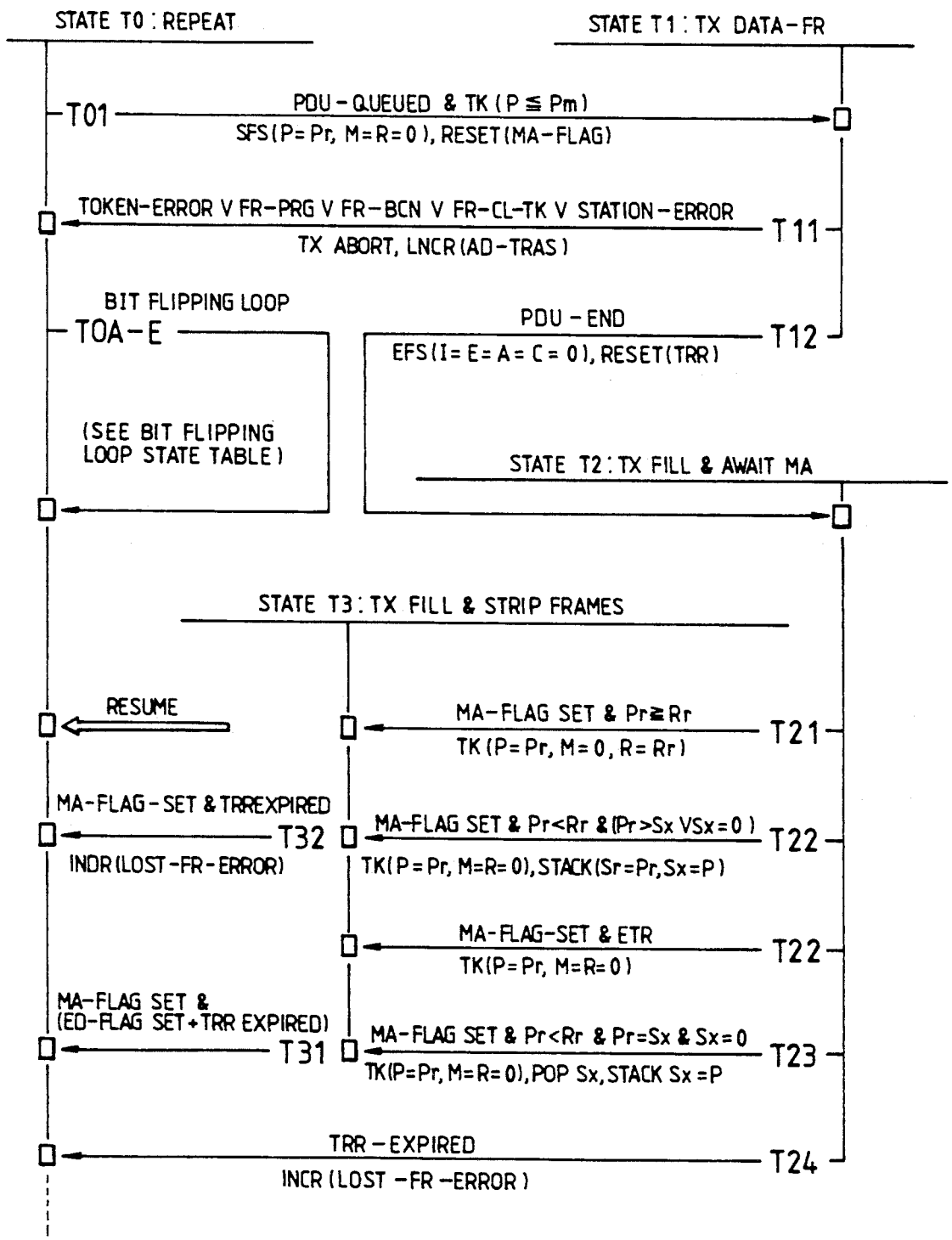
FIG. 6 is a state transition diagram explaining one example of communication protocol in a communication processor.

FIG. 6 shows one example of state transition of the communication protocol in the above processor LANPC. Referring to the figure, description will be made regarding the present state number, transition event, etc.

The LAN protocol of this example complies with international standards ANSI/IEEE 802.5 and ISO/IS 8802/5. FIG. 6 shows a part of the state transition used for the management of transmission priority.

Referring to FIG. 6, the background of the LAN processor LANAC to which this invention is applied will be explained. For details of meaning of fundamental terms such as token and frame, reference should be made to literature of the above international standards (such as ISO/TC 97/SC 6N4477, 1987-02-12, pp7-13, ISO/TC 97/SC 6N 1987-03-03, pp1-3).

There are two types of monitors—an active monitor and a standby monitor. The former is used to recover a normal condition from error states such as an infinite looping of a token or frame with a high priority level, in which there is no normal frame or token. The active monitor also performs the transmission repeat of a code by using an oscillator of its station and inserts a latency buffer into the ring. The latency buffer has the following two functions.

(1) Guarantee of minimum delay time

When all stations are in the repeat state, there should be a delay, at least for a token sequence (24 bits), to make the token circulate continuously on the ring. For this purpose, the active monitor inserts a 24-bit latency buffer into the ring (2) Compensation for phase jitter The source timing or master clock is supplied by the active monitor and the stations on the ring are synchronized by using an input signal. Therefore, the data signaling a trace circulating on the ring is controlled by the active monitor. The ring segments may instantaneously perform actions slightly before or behind the master clock. Accumulation of these timing errors, when a large number of stations are inserted in the ring, will result in a delay of ±3 bits or less on the ring. However, the ring delay may not be constant When the ring delay decreases, a bit loss may occur and when the ring delay increases, a bit inclusion may occur. To cope with this problem, an elastic buffer of six bits is used that can change the buffer size according to the delay of the ring. Thus, with the elastic buffer combined with the stationary 24-bit buffer, the active monitor can accommodate a delay of 24 bits to 30 bits. The buffer as a whole is initialized to 27 bits.

The standby monitor checks the normal operation of the active monitor. When it receives a frame addressed to this station, the standby monitor copies it in memory and outputs it on the ring downstream. When a frame received is addressed to another station, the standby monitor simply sends out (or repeats) the frame downstream. When a token is received, the standby monitor compares the priority bit of the token with the priority bit of a frame waiting to be transmitted in this station. If the priority bit of the frame in the station is equal to or higher than that of the received token, the monitor takes over the transmitting right and transmits the frame.

In FIG. 6, the vertical lines represent states and the arrows represent the directions of transition, with the upper side of the arrow indicating an input event and the lower side indicating an output or action.

Suppose the initial state is T0, i.e., a repeat state. In this state, when the station has a queued PDU (an information unit, with a priority Pm, to carry control information and data between entities at the same level) and the priority of the received token P is P≦Pm (this corresponds to the occurrence of an event in the transition T01 of the figure), the monitor writes the bits in the start frame sequence (SFS) field as follows.

(1) Priority bit P=Pm (2) Monitor bit M=reserved bit R=0

(3) MA (my address) flag is reset.

This is the output or action that occurs at the transition T01 of the figure. At this transition the monitor shifts to the repeat state (next state: state T1). Each state and event (input) are assigned with a predetermined code number and set in a dedicated register in the monitor by the core processor CRC1. This will be described later.

Next, as shown by a transition T12, when at state T1 the PDU transmission is completed (which is identical to an event), all bits in an end frame sequence (EFS) field— intermediate bit I, error bit E, address recognized bit A and copy bit C— are set to "0" and a TRR timer and an error flag are reset. With this processing, the frame data transmission is completed, shifting the monitor to a state T2 (TX FILL & AWAIT MA).

In the state T2, the monitor continues sending FILL (all "0" pattern) until the MA (my address) is set, i.e., the transmission frame from the station circulates through the ring and returns to the originating station. In the state T2, a transition T21 occurs, i.e., the MA flag is set and, when the priority P of the frame received is P>Pr (reserved bit), the token shown is transmitted, shifting the state to state T3.

In the state T3, the monitor continues sending FILL and at the same time eliminates frames from the ring. At the state T3 when the MA flag is set and either the I flag is set (detection of ED field) or the TRR timer expires (which is identical to an event), this means that the transmission frame has circulated through the ring and has been completely taken into the monitor, which then returns to the repeat state, i.e., the state T0.

The above representative state transition is performed by the microprogram control of the core processor CPC 1. The monitor detects the present state by the core processor CPC1 inside. When hardware informs of the occurrence of an event to the core processor through interruption, the core processor generates a microprogram address of the action routine and a next state (code) by using the state ROM. The action is carried out by executing the microprogram.

In Table 1, the bit $2^{15}$ in the present state field indicates a standby monitor when it is "0" and an active monitor when it is "1". The remaining three bits $2^{14}$ to $2^{12}$ indicate a state number.

The transition event represents an event as when the previous state has changed to the present state, by using fours bits $2^{11}$ to $2^8$. For example using the hexadecimal system in numbers 0 to 9 and A to F, 0 represents the final FIFO, 1 to B a monitor FSM transition kind, C a high order bits specification, D an emergy error, E a lobe-wire breakdown, and F a frequency error.

As to the elapsed time, when the real number part is 9 and the exponential part is 7, the time is $9 \times 2^7 = 1152$ to $1152 + 127$ ms. The resolution in this case is $2^7 = 128$ and the error is $2^7 - 1 = 127$. By representing the elapsed time in this way, the dynamic range of the elapsed time can be made large with as small a bit number as 8 bits.

The advantages of the above embodiment are as follows.

(1) In a program control apparatus with a program ROM which forms sequence control signals for executing various control actions according to specified conditions, a memory circuit is provided which is activated during a particular operation mode to successively store information corresponding to the external conditions and also information concerning the time taken by the operation sequence of the program control apparatus. By reading the contents of the memory circuit, a series of states through which the sequence control operation has passed under a certain condition can be known. This in turn makes it possible to easily debug a microprogram being developed or perform a system debugging on the real equipment.

(2) Since the state transition information is used as trace information and the elapsed time for the sequence operation is represented by a real number part and an exponential part, the information can be compressed. This in turn gives rise to the advantage that with the addition of only a small FIFO memory, a state trace circuit to debug the microprograms can be incorporated.

(3) Because of the above advantages (1) and (2), no special emulators or logic analyzers are needed, reducing cost for system development and debugging on real equipment.

(4) Even during the operation of the program control apparatus, it is possible to know the state transition at which an error occurred, by enabling the trace function. This facilitates the detection of a fault and maintenance.

In the foregoing, the invention has been described by referring to an example embodiment. It should be noted, however, that this invention is not limited to the preceding embodiment alone but that many modifications may be made without deviating from the spirit of the invention. For example, while in FIG. 2 the FIFO memory 15 is formed as a shift register, the memory may be formed of a plurality of registers or RAM which have a selection circuit and a pointer that is incremented by read/write operations. The selection circuit is controlled by the write address and read address to write and read data to/from the memory in the first-in-first-out mode. Instead of these FIFO memories, it may be a simple memory. In this case, the core processor CPC 1 writes the trace information into memory in a predetermined order of address and the host processor reads data from memory in that order of address.

In FIG. 3, the state ROM SROM20, which generates an address for the microprogram ROM mROM11 and a next state number, may be replaced with a logic block that generates a processing routine address for the microprogram ROM mROM11, such as a sequencer.

The microprogram ROM mROM11 in this invention should not be interpreted as a narrowly defined ROM which stores microinstructions, but as is apparent from the previous description, it should be understood to be a ROM in a broad sense whose output signals are used to control a variety of sequence operations or control actions such as information processing and process control. Therefore, the microprogram ROM may be formed of RAM. In this case, the write operation on RAM can be controlled by the host processor HPC14.

This invention can be applied widely not only to the LAN processors but also to program control apparatuses which operate according to external set conditions and which are used for automotive engine control or various other sequence control using microcomputers.

A major advantage that is brought about by the representative embodiment of this invention may be summarized as follows. In a program control apparatus with a program ROM which forms sequence control signals for executing various control actions according to specified conditions, a memory circuit is provided which is activated during a particular operation mode to successively store information corresponding to the external conditions and also information on times taken by the operation sequence of the program controller. By reading the contents of the memory circuit, a series of states through which the sequence control operation has passed under a certain condition can be known. This in turn makes it possible to easily debug a microprogram being developed or perform a system debugging on the real equipment.

What is claimed is:

1. A digital data communication processor formed on a semiconductor substrate comprising:
   sequence control means for storing programs that generate sequence control signals to perform various control actions according to specified state and event codes; and
   memory means operatively associated with said sequence control means for successively storing state and event information corresponding to the specified state and event codes and time information concerning the time spent in an operation sequence depending on the specified state code.

2. The digital data communication processor as set forth in claim 1, wherein the sequence control means comprises decoding means for decoding the specified state and event codes and microprogram memory means for storing microprograms, wherein the microprogram memory means is specified with a start address to generate a series of sequence control signals according to the specified state and event codes.

3. The digital data communication processor as set forth in claim 2, wherein the memory means is a FIFO memory.

4. The digital data communication processor as set forth in claim 2, wherein the decoding means and the microprogram memory means are formed of ROM.

5. The digital data communication processor as set forth in claim 2, wherein at least one of the decoding means and the microprogram memory is formed of RAM.

6. The digital data communication processor as set forth in claim 2, wherein the state information to be stored in said memory means successively corresponds to current states and the event information to be stored in said memory means corresponds to events which generate state transitions.

7. The digital data communication processor as set forth in claim 6, wherein the time information to be stored in said memory means includes a real number part and an exponential part.

8. An error detecting assembly incorporated into a digital data communication processor which is formed on a semiconductor substrate and which includes a microprogram ROM, wherein said microprogram ROM forms sequential control signals for executing selected sequence control operations depending on state and event codes, said error detecting assembly comprising:
a memory circuit for successively storing contents including states and event information corresponding to the state and event codes and time information concerning the time spent by a sequence control operation depending on the state code; and,
a reading means for reading the contents of said memory circuit wherein the contents of said memory circuit is used to reveal the states through which the sequence control operations have passed.

9. The error detecting assembly incorporated into the digital data communication processor as set forth in claim 8, wherein said contents of said memory circuit is supplied to a tracing means which is provided outside of said digital data communication processor to trace the state of the sequence control operations executed therein.

10. The error detecting means incorporated into the digital data communication processor as set forth in claim 9, wherein the time information includes a real number part and an exponential part.

11. The error detecting assembly incorporated into the digital data communication processor as set forth in claim 8, wherein the state information to be stored in said memory circuit successively corresponds to current states and the event information to be stored in said memory circuit corresponds to events which generate state transitions.

12. An error detecting method for use in a digital data communication processor formed on a semiconductor substrate, said error detecting method comprising the steps of:

operating a microprogram ROM through a plurality of states, wherein said operating forms sequential control operations depending on state and event codes;
successively storing information in a memory circuit wherein said information includes state and event information corresponding to the state and event codes and time information concerning the time spent in a sequence control operation depending on the state code;
reading the contents of said memory circuit wherein the contents of said memory circuit reveal the states through which the sequence control operations have passed; and,
tracing the state of the sequence control operation executed in said digital data communication processor by using the contents of said memory circuit.

13. The error detecting method for use in the digital data communication processor as set forth in claim 12, wherein the state information to be stored in said memory circuit is present state information and the event information to be stored in said memory circuit is state transition event information.

14. The error detecting method for use in the digital data communication processor as set forth in claim 13, wherein the time information includes a real number part and an exponential part.

15. The error detecting method for use in the digital data communication processor as set forth in claim 12, wherein the tracing includes tracing the state of a program stored in the program ROM.

16. A digital data communication controller formed on a semiconductor substrate comprising:
sequence control means for storing microprograms that generate sequence control signals to perform various control actions according to specified state and event code; and
memory means operatively associated with said sequence control for successively storing state and event information corresponding to the specified state and event code and time information concerning the time spent in each state according to the specified state code.

17. The digital data communication controller as set forth in claim 16, wherein the sequence control means comprises decoding means for decoding the specified state and event code and for generating microprogram memory address signals, and microprogram memory means, wherein the microprogram memory means stores microinstruction codes and executes a routine program according to the specified state and event code.

18. The digital data communication controller as set forth in claim 17, wherein the memory means is a FIFO memory.

19. The digital data communication controller as set forth in claim 17, wherein the decoding means and the microprogram memory means are formed of ROM.

20. The digital data communication controller as set forth in claim 17, wherein at least either of the decoding means and the microprogram memory is formed of RAM.

21. The digital data communication controller as set forth in claim 17, wherein the state information to be stored in said memory means successively corresponds to current states and the event information to be stored in said memory means corresponds to events which generate state transitions.

22. The digital data communication controller as set forth in claim 21, wherein the time information to be stored in said memory means includes a real number part and an exponential part.

23. An error detecting assembly incorporated into digital data communication controller which is formed on a semiconductor substrate and which includes a microprogram ROM, wherein said microprogram ROM forms sequential control signals for executing selected sequence control operations depending on state and event code, said error detecting assembly comprising:
  a memory circuit for successively storing a contents including state and event information corresponding to the state and event code and time information concerning the time spent by each state; and,
  a reading means for reading the contents of said memory circuit wherein the contents of said memory circuit is used to reveal the states through which the sequence control operations have passed.

24. The error detecting assembly incorporated into the digital communication controller as set forth in claim 23, wherein said contents of said memory circuit is supplied to tracing means for tracing the state of the sequence control operations executed in said digital communication controller.

25. The error detecting means incorporated into digital data communication controller as set forth in claim 21, wherein the time information includes a real number part and an exponential part.

26. The error detecting assembly incorporated into digital data communication controller as set forth in claim 25, wherein the state information to be stored in said memory circuit successively corresponds to current states and the event information to be stored in said memory circuit corresponds to events which generate state transitions.

27. An error detecting method for use in a digital data communication controller formed on a semiconductor substrate, said error detecting method comprising the steps of:
  operating a microprogram ROM, wherein said operating forms sequential control operations depending on state and event code, wherein the operating comprises passing through a plurality of states;
  successively storing information in a memory circuit wherein said information includes state and event information corresponding to the state and event code and time information concerning the time spent by each state depending on the state code;
  reading the contents of said memory circuit wherein the contents of said memory circuit reveal the states through which the sequence control operations have passed; and,
  tracing the each state of the sequence control operations executed in said digital data communication controller by using the contents of said memory circuit.

28. The error detecting method for use in the digital data communication controller as set forth in claim 27, wherein the state information to be stored in said memory circuit is present state information and the event information to be stored in said memory circuit is state transition event information.

29. The error detecting method for use in the digital data communication controller as set forth in claim 28, wherein the time information includes a real number part and an exponential part.

30. The error detecting method for use in the digital data communication controller as set forth in claim 27, wherein the tracing includes tracing the state of a program stored in the microprogram ROM.

* * * * *